United States Patent
Schrag et al.

(10) Patent No.: US 8,473,445 B2
(45) Date of Patent: Jun. 25, 2013

(54) REAL-TIME STORY GENERATION

(75) Inventors: Nicholas D. Schrag, Chicago, IL (US);
Patrick M. Curry, Chicago, IL (US);
Elliot F. Dunn, Chicago, IL (US)

(73) Assignee: Disney Enterprise, Inc, Burbank, CA (US)

( * ) Notice: Subject to any disclaimer, the term of this patent is extended or adjusted under 35 U.S.C. 154(b) by 511 days.

(21) Appl. No.: 12/848,948

(22) Filed: Aug. 2, 2010

(65) Prior Publication Data
US 2012/0030249 A1 Feb. 2, 2012

(51) Int. Cl.
*G06F 17/00* (2006.01)

(52) U.S. Cl.
USPC .................................. 706/48; 463/9; 707/803

(58) Field of Classification Search
USPC ................................................ 706/48; 463/9
See application file for complete search history.

(56) References Cited

U.S. PATENT DOCUMENTS

| 7,363,203 | B2 * | 4/2008 | Hines | 703/2 |
| 7,519,589 | B2 * | 4/2009 | Charnock et al. | 1/1 |
| 2007/0038386 | A1 * | 2/2007 | Schadt et al. | 702/20 |
| 2009/0157663 | A1 * | 6/2009 | Kate | 707/5 |

OTHER PUBLICATIONS

Jeroen Keppens and John Zeleznikow. 2003. A model based reasoning approach for generating plausible crime scenarios from evidence. In Proceedings of the 9th international conference on Artificial intelligence and law (ICAIL '03). ACM, New York, NY, USA, 51-59.*
Luo, Z.; Gammerman, A.; , "A probabilistic reasoning system based on a causal graph approach ," Knowledge Engineering, IEE Colloquium on , vol., no., pp. 4/1-4/3, May 15, 1990.*

* cited by examiner

*Primary Examiner* — Jeffrey A Gaffin
*Assistant Examiner* — David H Kim
(74) *Attorney, Agent, or Firm* — Patterson & Sheridan LLP

(57) ABSTRACT

Systems, methods and computer-readable media are disclosed for providing a framework for generating problem situations in a computer game. In one embodiment, the framework includes a data structure representing solution candidates, fact patterns, and a solution designator. The data structure also includes a chain of inference between the solution designator and each candidate. The computer game may generate a problem situation from the data structure and present the problem situation to a user playing the computer game.

23 Claims, 13 Drawing Sheets

Hat_5: It's a striped party hat with strands of short hair in it.
Hat_6: It's a striped ball cap with strands of long hair in it.
Hat_7: It's a striped party hat that appears to have been worn by someone.
FloorBoardHat_0: A floorboard pops open revealing a hidden hat.
PartyTestimony_0: The guilty party fled the scene in a party costume, so I couldn't make anything out. I wish my tesimony were more useful.
FloorBoardTestimony_0: I saw a suspicious person tugging on the floorboards. They were hunched way over.
EmbarrassedPartyHat_0: I know the Butler can't be guilty. At the time of the crime, I saw him wearing a party hat and quietly weeping to himself. What's his deal?
CulpritStripeTestimony_0: I happen to know that the culprit is quite fond of stripes.

226 {
- Hat_5: It's a striped party hat with strands of short hair in it.
- Hat_6: It's a striped ball cap with strands of long hair in it.
- Hat_7: It's a striped party hat that appears to have been worn by someone.
- FloorBoardHat_0: A floorboard pops open revealing a hidden hat.
- PartyTestimony_0: The guilty party fled the scene in a party costume, so I couldn't make anything out. I wish my tesimony were more useful.
- FloorBoardTestimony_0: I saw a suspicious person tugging on the floorboards. They were hunched way over.
- EmbarrassedPartyHat_0: I know the Butler can't be guilty. At the time of the crime, I saw him wearing a party hat and quietly weeping to himself. What's his deal?
- CulpritStripeTestimony_0: I happen to know that the culprit is quite fond of stripes.

FIG. 2
(CONTINUED)

Hat_5: It's a striped party hat with strands of short hair in it.
*Hat_6: It's a striped ball cap with strands of long hair in it.*
*Hat_7: It's a striped party hat that appears to have been worn by someone.*
FloorBoardHat_0: A floorboard pops open revealing a hidden hat.
PartyTestimony_0: The guilty party fled the scene in a party costume, so I couldn't make anything out. I wish my tesimony were more useful.
FloorBoardTestimony_0: I saw a suspicious person tugging on the floorboards. They were hunched way over.
EmbarrassedPartyHat_0: I know the Butler can't be guilty. At the time of the crime, I saw him wearing a party hat and quietly weeping to himself. What's his deal?
*CulpritStripeTestimony_0: I happen to know that the culprit is quite fond of stripes.*

FIG. 3A
(CONTINUED)

Hat_5: It's a striped party hat with strands of short hair in it.
Hat_6: It's a striped ball cap with strands of long hair in it.
Hat_7: It's a striped party hat that appears to have been worn by someone.
FloorBoardHat_0: A floorboard pops open revealing a hidden hat.
PartyTestimony_0: The guilty party fled the scene in a party costume, so I couldn't make anything out. I wish my tesimony were more useful.
FloorBoardTestimony_0: I saw a suspicious person tugging on the floorboards. They were hunched way over.
EmbarrassedPartyHat_0: I know the Butler can't be guilty. At the time of the crime, I saw him wearing a party hat and quietly weeping to himself. What's his deal?
CulpritStripeTestimony_0: I happen to know that the culprit is quite fond of stripes.

FIG. 3B
(CONTINUED)

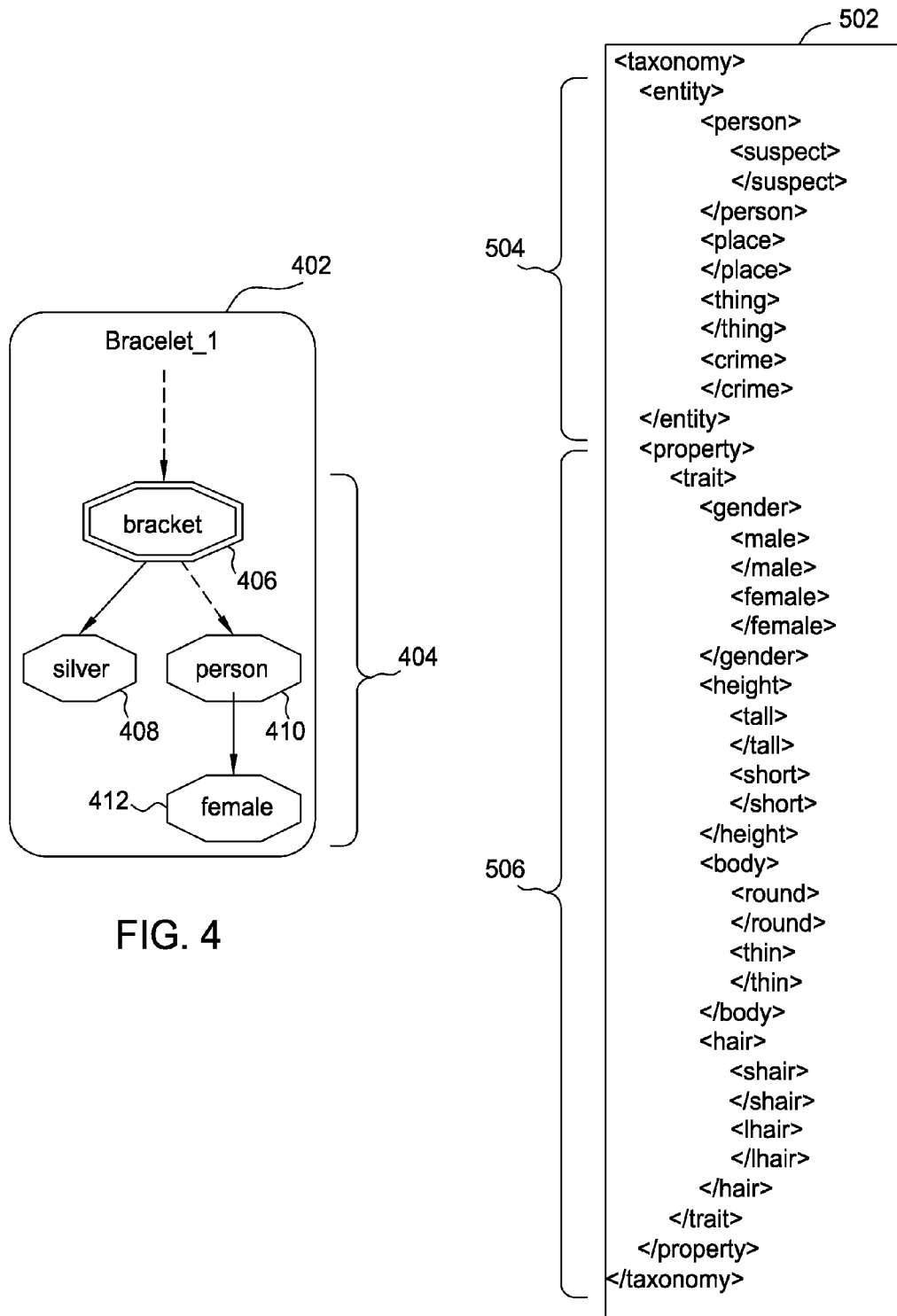

FIG. 6A

Guilty Party Web Mystery

RandomCaseID: 45523M.2B25-PLB3-RNM0-47NC-NMR8-6DW8
Level: OperaHouseTestRandom
Mode: Team
Difficulty: Easy

| Image | Clue type | Object name | Entity name | Text |
|---|---|---|---|---|
| | | | the crime | The crime was committed in the Dressing room. |
| | | | Judith Prudence | I hope this helps you bring the culprit to justice... |
| | | nail polish | nail polish in the Costumes | It's a bottle of nail polish. On the label it makes some bold claims. "Increases luck. Doubles your Chi. Good for your liver. Makes short hair more lustrous." |
| | | | Fifi Fromage | I couldn't be the guilty party, detective. I was busy all day setting up for my tea party with the Butler. |
| | | | Schmoot | Don't bother going into the Costumes room. There's nothing in there. |
| | | | Dolly Binaca | I really don't think the Gardener was involved in this crime. |

FIG. 6A (CONTINUED)

| Image | Clue type ~606 | Object name ~608 | Entity name ~610 | Text ~612 |
|---|---|---|---|---|
| | | a locket | a broken locket in the Diva | It's half of a broken locket. Inside it reads, "To my favorite criminal. I love your ..." |
| | | | Dolly Binaca | I heard the culprit say to the victim, 'You'll never make fun of my nail polish again.' |
| | | | Judith Prudence | The Butler knows everything that goes on here - it's his job! Go ask him. |

| Image ~604 | Clue type ~606 | Object name ~608 | Entity name ~610 | Text ~612 |
|---|---|---|---|---|
| | | | Schmoot | Schmoot was busy at the time of the crime. Schmoot was teachin' his pet newt to use the litter box. |
| | | a slip of paper | a fortune-cookie fortune from the judge | This must be the culprit's fortune cookie. It reads, " All those people who said you were too much of a lightweight to break the law will be proved wrong soon." |

| Image | Clue type | Object name | Entity name | Text |
|---|---|---|---|---|
|  |  | a locket | a broken locket in the Box | it's half of a broken locket. Inside it reads, "... long legs." |
|  | | | Thaddeus Bilge | The guilty party has short hair like the teacher. |
| 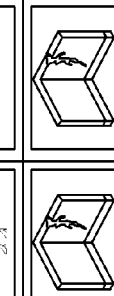 | | | Minnie Wigwam | At the time of the crime, I saw the Gardener bump into the wall and break a decorative plate! It's not like clumsiness is a crime, but he should still say he's sorry. |
|  | | a crack | a crack in the wall in the Crypt | There is a crack in the wall with some long hairs wedged in the crack. |

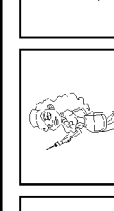

Who do you want to accuse? [TheSuspectMaid_0 ▽] [Accuse!] CORRECT

REAL-TIME STORY GENERATION

BACKGROUND

1. Field

Embodiments of the invention relate generally to computer games and, more particularly, to a framework for generating problem situations in computer games.

2. Description of the Related Art

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters or other features of the game.

Generally, the designer of the computer game will create a computer-rendered world in which the computer game characters or other features may interact. For example, many computer games allow a player to maneuver an avatar (e.g., a sprite or character) through a computer-rendered world to accomplish a set of tasks, such as solving a mystery in the computer game. In two-dimensional computer games, characters may move in two dimensions (e.g., up and down on the screen or left and right), while in three-dimensional computer games, characters are typically allowed to move in three dimensions in the computer-rendered world.

SUMMARY

Embodiments of the invention provide a computer-implemented method, computer-readable storage medium, and system for performing an operation that includes providing a framework for generating a plurality of problem situations in a computer game, wherein the framework includes a data structure representing: (i) a plurality of candidates associated with the plurality of problem situations, (ii) a plurality of fact patterns associated with the plurality of candidates, and (iii) a designation of at least one of the plurality of candidates as a solution to a problem situation of the plurality of problem situations; wherein each of the plurality of fact patterns includes at least one property used for determining an association in the data structure, wherein the data structure includes a chain of inference between the designation and each candidate of the plurality of candidates, wherein each chain of inference includes at least one of the plurality of fact patterns. The operation may also include generating, from the data structure, a representation of the problem situation by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

Another embodiment of the invention provides a data structure stored on a computer readable storage medium, where the data structure includes: (i) a plurality of candidates associated with a plurality of problem situations of a computer game; (ii) a plurality of fact patterns associated with the plurality of candidates; (iii) a designation of at least one of the plurality of candidates as a solution to a problem situation of the plurality of problem situations; and (iv) a chain of inference between the designation and each candidate of the plurality of candidates, wherein each chain of inference includes at least one of the plurality of fact patterns. Each of the plurality of fact patterns includes at least one property used for determining an association in the data structure. A representation of the problem situation is generated from the data structure by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

Yet another embodiment of the invention provides a computer-implemented method for performing an operation that includes providing a framework for generating a plurality of mysteries in a computer game, wherein the framework includes a data structure representing: (i) a plurality of suspects associated with the plurality of mysteries, (ii) a plurality of clues associated with the plurality of suspects, and (iii) a designation of at least one of the plurality of suspects as a culprit; wherein each of the plurality of clues includes at least one property used for determining an association in the data structure, wherein the data structure includes a chain of inference between the designation and each suspect of the plurality of suspects, wherein each chain of inference includes at least one of the plurality of clues. The operation also includes generating, from the data structure, a representation of a mystery of the plurality of mysteries by determining a subset of the plurality of clues of the data structure to include in the representation of the mystery, wherein the representation of the mystery includes the chain of inference between the designation and a suspect of the plurality of suspects, whereby the chain of inference designates the suspect as the culprit of the mystery in the computer game.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a hierarchy of labels for a clue node representing a female silver bracelet, according to one embodiment of the invention.

FIG. 5 illustrates an exemplary structure of a taxonomy, according to one embodiment of the invention.

FIGS. 6A-6B illustrate a graphical user interface (GUI) screen of the computer game, according to one embodiment of the invention.

DETAILED DESCRIPTION

Figure 1:
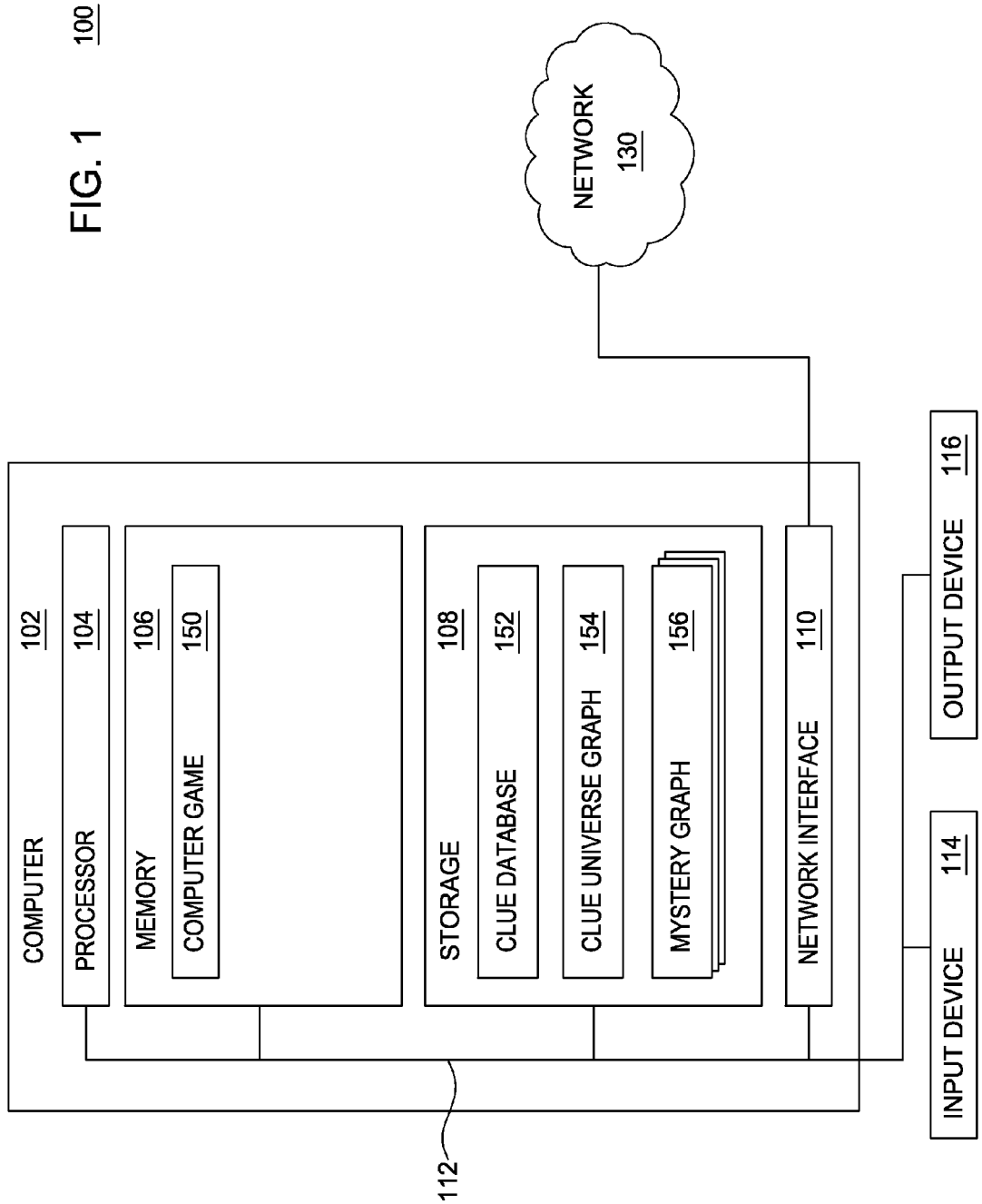
FIG. 1 is a block diagram illustrating a system for generating mysteries in a computer game, according to one embodiment of the invention.

Embodiments of the invention generally provide a framework for generating problem situations in a computer game, for a user playing the computer game to solve. In one embodiment, the framework includes a data structure representing a set of fact patterns in the computer game, where the set of fact patterns constitutes the entire universe of fact patterns in the computer game. Depending on the embodiment, the fact patterns may be created programmatically or input by a user (e.g., a game developer). Once the data structure representing the fact patterns is generated, the computer game selects one or more of the fact patterns to include in a particular problem situation in the computer game. For example, if the data structure is a graph, the computer game may select one or more nodes and/or edges of the graph to form a sub-graph representing the particular problem situation. Each distinct subset of nodes and/or edges may represent a different problem situation that can be solved by a user playing the computer game. The fact patterns allow the user to draw inferences to select a candidate for solving the problem situation in the computer game. The candidate may be an avatar of another player, a non-player character, an inanimate object, a location, or a time in the computer game.

To facilitate understanding of the disclosure, embodiments of the invention are herein described in the context of a mystery involving a crime scene and multiple suspects, one of whom is the culprit. The user (or users) playing the computer game is asked to determine which of the suspects is the culprit, based on clues provided by the computer game. Accordingly, in this context of the mystery, the problem situation corresponds to the mystery, the candidates correspond to the suspects, and the fact patterns correspond to the clues. The computer game generates a graph representing a set of clues—namely, the entire universe of clues in the computer game. The computer game then generates a sub-graph representing a particular mystery to be solved by the user playing the computer game.

In one embodiment, before presenting the mystery to the user, the computer game may also evaluate and/or modify various properties of the mystery. For example, the computer game may evaluate whether the mystery is logically coherent. The computer game may also modify the mystery to enhance a narrative property of the mystery or to customize the difficulty level of the mystery (e.g., by including false alibis). Accordingly, greater numbers of distinct mysteries may be more efficiently and/or conveniently generated for the computer game, thereby providing the user with a richer variety of mysteries. For example, rather than predefined by a developer of the computer game, mysteries may be generated on-the-fly, responsive to a request from the user playing the computer game. Further, quality and/or entertainment value of mysteries may be improved, thereby improving user satisfaction with the computer game.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for generating mysteries in a computer game, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game program) or related data available in the cloud. For example, the computer game described herein could execute on a computing system in the cloud, thereby allowing users to access the game from any computing system attached to a network connected to the cloud (e.g., the Internet).

As shown, the memory 106 of the computer 102 includes a computer game 150. In one embodiment, the computer game includes a puzzle to be solved. The puzzle may be, without limitation, a mystery involving a crime. The user playing the computer game may be asked to solve the puzzle (e.g., determine the culprit who committed the crime). Although the computer game may be a puzzle game, those skilled in the art will recognize that the techniques disclosed herein may be applied to a game of any genre, that includes a puzzle. Depending on the embodiment, computer games may include games of one or more of the following genres: puzzle, action, adventure, arcade, role-playing, simulation, sports, racing, fighting, shooting, shooter, strategy.

As shown, the storage 108 of the computer 102 includes a clue database 152, a clue universe graph 154, and a mystery graph 156. In one embodiment, the clue database 152 stores clues which are created programmatically or input by a user via a user interface. The computer game 150 generates the clue universe graph 154 using the clues from the clue database 152. The clue universe graph 154 represents the entire universe of clues in the computer game 150. In the clue universe graph 154, clues are represented as nodes, and associations between clues are represented as edges between nodes. Further, as described in further detail below, other entities, such as suspects and locations (e.g., rooms of a building), may also be represented as nodes in the clue universe graph 154. While embodiments herein are described with reference to a clue universe graph and a mystery graph, those skilled in the art will recognize that other data structures may be used to represent the universe of clues and/or the mystery. For example, any data structure that can represent clues and associations between the clues may be used. In one embodiment, the data structure does not include any first-order logic involving the clues.

In one embodiment, after generating the clue universe graph 154, the computer game 150 selects a subset of nodes and/or edges from the clue universe graph 154 to form the mystery graph 156. In one embodiment, the mystery graph 156 represents a mystery to be solved by a user playing the computer game 150. Each distinct subset of selected nodes and/or edges represents a different mystery that may be solved by a user playing the computer game. Accordingly, the computer game 150 may more efficiently and/or conveniently generate greater numbers of distinct mysteries, thereby providing the user with a richer variety of mysteries and increasing user satisfaction with the computer game.

Figure 2:
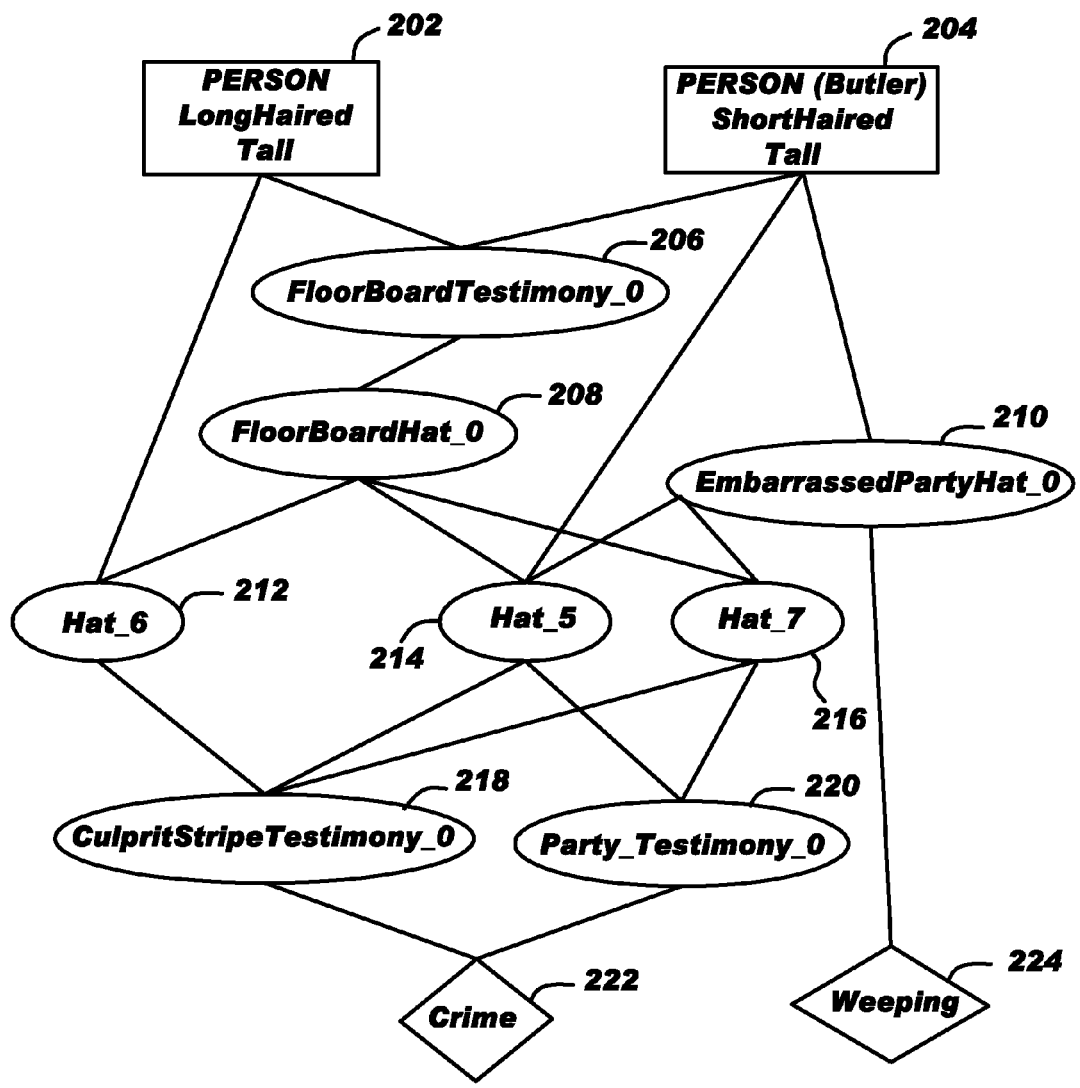
FIG. 2 illustrates a clue universe graph, according to one embodiment of the invention.

FIG. 2 illustrates a particular embodiment of the clue universe graph 154 of FIG. 1, according to one embodiment of the invention. Generally, the clue universe graph 154 includes nodes and edges between the nodes. As shown, the nodes include two suspect nodes 202, 204, a crime node 222, and nine clue nodes. The nine clue nodes include three object nodes 212, 214, 216 (each representing a hat), five testimony nodes 206, 208, 210, 218, 220, and an action node 224 (representing weeping).

In one embodiment, each node may store additional properties of the respective node. For example, depending on the embodiment, each clue node may include a narrative component and a logical component. The narrative component includes text 226. The computer game 150 uses the text 226 for a clue to narrate the clue to the user playing the computer game 150. For example, the computer game 150 may narrate, "It's a striped party hat with strands of short hair in it" for the object node 214 ("Hat_5"). Depending on the embodiment, aside from the text 226, the narrative component may also include a title and/or and images for conveying a clue represented by the clue node to the user playing the computer game 150. That is, the text, image, and/or title of the clue may be presented to the user via a GUI screen of the computer game. For example, the computer game 150 may present a title "striped hat" and a graphical image of a striped hat for the object node 214 ("Hat_5").

In one embodiment, the logical component includes a type of the clue node (e.g., object, testimony, etc.) a function of the clue node (e.g., lead, evidence, alibi), and labels associated with the clue node. The labels may include nouns and adjectives that correspond logically to the narrative component of the clue node. In other words, the narrative component presents the clue to the user, while the labels present the clue to the computer game 150. The logical component of the clue node is further described below in conjunction with FIG. 4.

In one embodiment, once the clue universe graph 154 is generated, the computer game 150 may generate the mystery graph 156 from the clue universe graph 154. The mystery graph 156 may be a sub-graph of the clue universe graph 154 and may be generated by the computer game 150 selecting a (e.g., random) path between the crime node 222 and one of the suspect nodes 202, 204. The path represents that the suspect (corresponding to the selected suspect node) is the culprit who committed the crime (corresponding to the crime node 222). In other words, the path represents a chain of inference that the suspect is the culprit who committed the crime. Object nodes, testimony nodes, and/or action nodes along the path represent clues linking the suspect to the crime. The clues allow the user playing the computer game 150 to solve the particular mystery represented by the mystery graph 156. Advantageously, the computer game 150 may use the clue universe graph 154 to more efficiently and/or conveniently generate greater numbers of distinct mysteries for the user to solve.

Figure 3A:
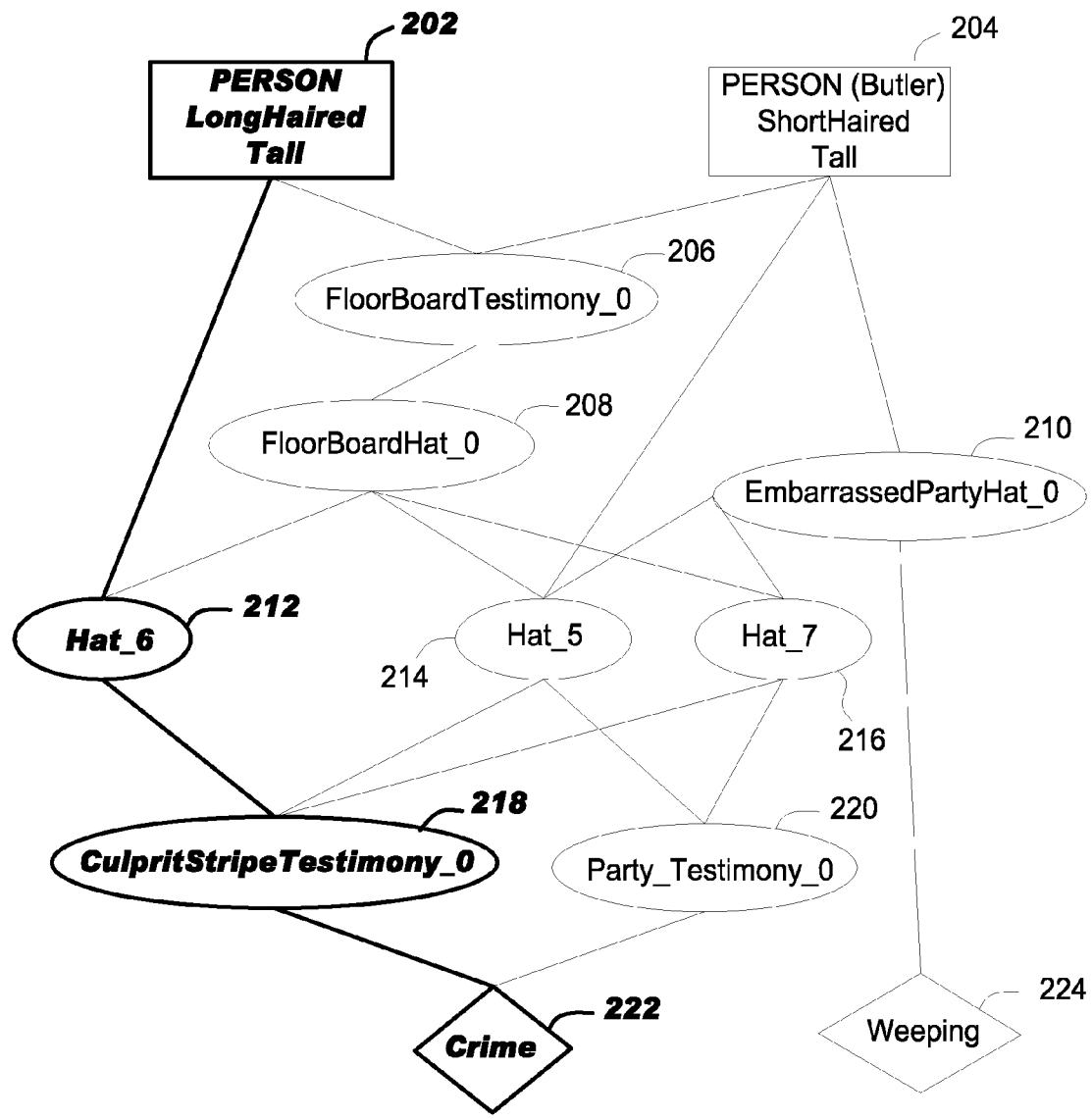
FIGS. 3A-3B illustrate two distinct mystery graphs generated from the clue universe graph, according to embodiments of the invention.
Figure 3B:
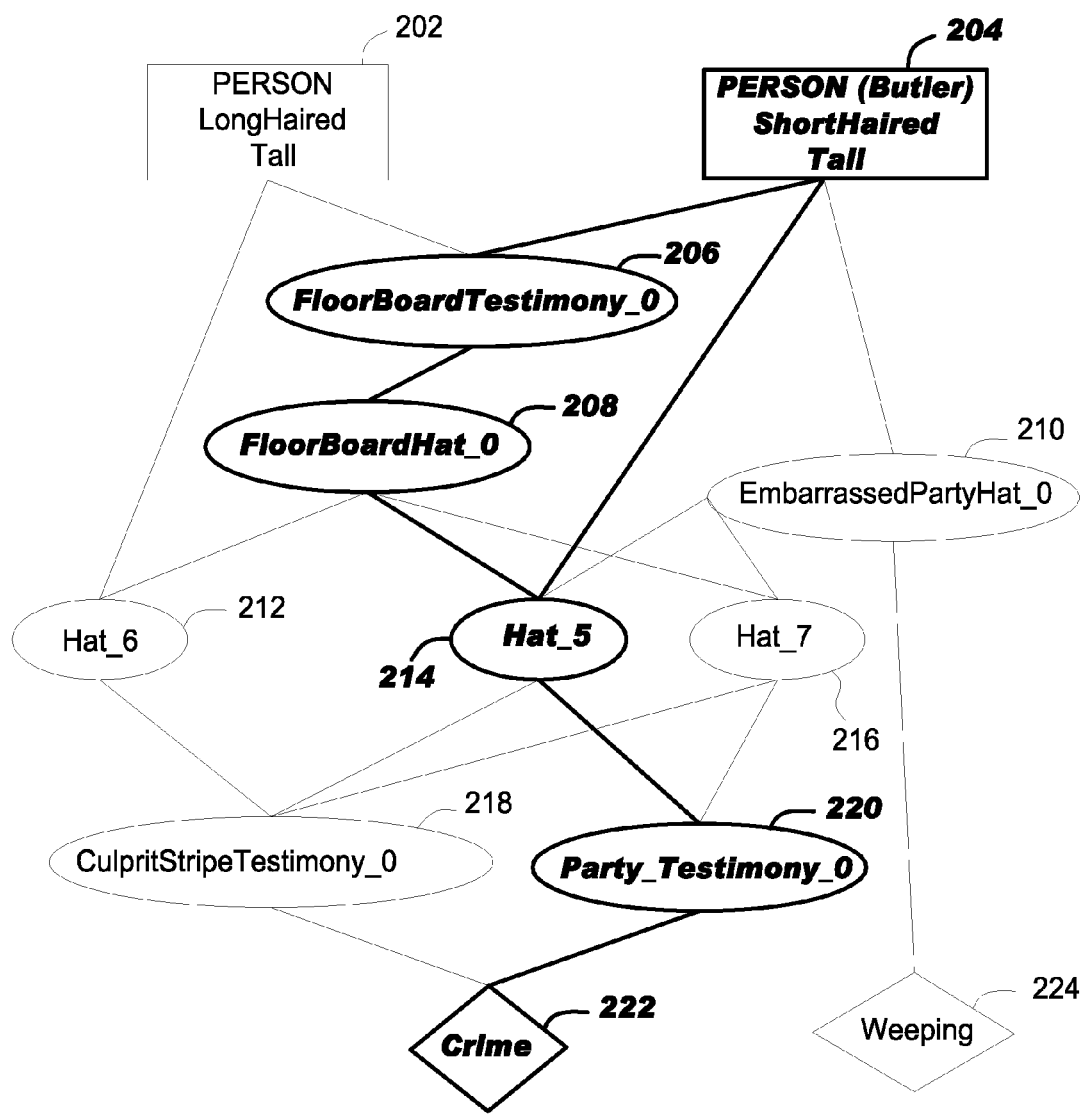

FIGS. 3A-3B illustrate two distinct mystery graphs 300, 350 generated from the clue universe graph 154 of FIG. 2, according to embodiments of the invention. As shown in FIG. 3A, the mystery graph 300 includes the suspect node 202, the object node 212, the testimony node 218, and the crime node 222. The object node 212 and the testimony node 218 represent clues linking the suspect (i.e., the tall, long-haired person) to the crime. Once the mystery graph 300 is generated, the computer game 150 may use the mystery graph 300 to present a mystery to the user, e.g., via one or more graphical user interface (GUI) screens of the computer game. The user may then solve the mystery using the clues represented by the object node 212 and the testimony node 218.

The mystery graph 350 of FIG. 3B includes the suspect node 204, the object node 214, three testimony nodes 206, 208, 220, and the crime node 222. In one embodiment, the object node 214 and the three testimony nodes 206, 208, 220 represent clues linking the suspect (i.e., the butler) to the crime. As with the mystery graph 300, once the mystery graph 350 is generated, the computer game 150 may use the mystery graph 350 to present a mystery to the user. The user may then solve the mystery using the clues represented by the object node 214 and the testimony nodes 206, 208, 220.

In one embodiment, each edge between nodes represents an association between entities represented by the nodes. For example, in FIG. 3B, an edge may exist between the object node 214 and the suspect node 204 if the object represented by the object node 214 is associated with the suspect represented by the suspect node 204 (e.g., via some properties of the object and/or suspect as indicated by the logical components of the respective nodes). For example, the object may be a hat bearing an inscription of a name of the suspect. In this case, the name is a common property of the respective nodes. As another example, the object may be a hat with strands of short hair in the hat, and the suspect may have short hair—in which case the edge may also exist between the object node 214 and the suspect node 204. Further, the object may also be linked to the suspect via testimony. For example, testimony that the suspect was seen wearing the hat may be represented as: (i) a first edge between the "hat" node and the testimony node and (ii) a second edge between the testimony node and the suspect node. Testimony may be given by a culprit, a suspect, or a character in the computer game who is not considered a suspect. In general, objects may be linked to a character (or to other entities, such as objects or locations) via verbal statements made by any character of the computer game. The verbal statements may be written statements, oral statements, etc. In some embodiments, a character may make a statement using body language (e.g., pointing to an object and then to a picture of another character) rather than making the statement verbally.

In one embodiment, each suspect represented in the clue universe graph 154 exhibits a distinct combination of traits. Assume that each suspect node in the clue universe graph stores properties of the respective suspect. Assume further that the properties include values representing hair length, height, gender, and body type. The stored values in a suspect node represent traits exhibited by the suspect—e.g., that the suspect is a tall, skinny female with long hair. Further, a developer of the computer game may specify how many distinct values exist for each property of the suspect node. For example, the developer may specify that two distinct values exist for gender (e.g., male and female) and three values exist for height (e.g., tall, medium, and short). The developer may also specify how many distinct properties exist. Reducing the number of properties and distinct values of properties result in fewer traits for the user to consider in solving a mystery, which may lead to easier mysteries in some cases. Accordingly, in an alternative embodiment, the number properties and/or the number of distinct values for each property may be customized by a user playing the computer game. Advantageously, the computer game 150 may more conveniently generate mysteries at difficulty level suited to the user (e.g., based on age range and/or preferences of the user).

In one embodiment, the clue universe graph 154 may include a single suspect for each distinct combination of traits. For example, properties of gender (male or female) and height (e.g., tall or short) may lead to four distinct suspects: a tall male, a short male, a tall female, and a short female. Including a single suspect for each distinct combination of traits allows the suspect to be uniquely identified using a corresponding distinct combination of traits. In an alternative embodiment, the computer game 150 may exclude one or more suspects from a particular mystery. In such cases, there may be some combinations of traits for which no suspect exists in the mystery. For example, if suspects of the mystery include multiple male suspects and only one female suspect, the female suspect may be identified in the mystery merely using a single trait of "female" (e.g., a female bracelet worn by the culprit). In other words, a suspect may be identified using a smaller number of traits (e.g., a specific gender) than the number of properties of each suspect (e.g., a specific gender and height).

While embodiments are described herein with reference to representing suspects as nodes in the clue universe graph 154, other embodiments are broadly contemplated. For example, in an alternative embodiment, the clue universe graph 154 may represent traits of suspects (rather than the suspects) as nodes. For instance, the clue universe graph may include a "male" node and a "female" node for the gender property of a suspect, a "tall" node and a "short" node for the height property of a suspect, etc. The computer game 150 may then generate a mystery graph 156 that links a distinct combination of trait nodes to the crime node. The distinct combination of trait nodes represents the culprit, while other combinations of trait nodes (that are not linked to the crime node) may represent (innocent) suspects. The computer game 150 may also use a lookup table that maps combinations of traits to suspects. For example, the lookup table may associate a tall male with the "Butler" suspect. The lookup table may include records, each storing a combination of traits and a corresponding suspect in the computer game 150.

As described above, each clue node of the clue universe graph 154 may include a narrative component and a logical component. The logical component presents the logical meaning of the clue to the computer game 150. In one embodiment, the logical component may include a hierarchy of labels characterizing the clue represented by the clue node. Each label may be a noun or an adjective characterizing the clue. For example, a clue node of the clue universe graph 154 may represent a book having a bookmark. The hierarchy may include a root label called "book", that represents the book. The root label may be associated with a child label (e.g., a noun) for each physical object that exists within the book. In this example, the bookmark may be called "bookmark" (the child label).

In one embodiment, a label representing a physical object may also be associated with a trait of a suspect. FIG. 4 illustrates a hierarchy 404 of labels for a clue node 402 representing a female silver bracelet, according to one embodiment of the invention. As shown, the hierarchy 404 includes a bracelet label 406, a silver label 408, a person label, 410, and a female label 412. In this particular example, the female trait associated with the bracelet is represented by: (i) an association of the bracelet label 406 with a person label 410 and (ii) an association of the person label 410 with the female label 412. Further, a label representing a physical object may also be associated with an adjective label representing a property of the physical object. For example, the silver aspect of the bracelet is represented by an association of the bracelet label 406 with the silver label 408.

While the hierarchy 404 specifies how elements of a clue node are arranged and/or associated with one another, a taxonomy may be used to determine whether to create an edge between clue nodes in the clue universe graph 154. The taxonomy may specify relationships between labels of a clue node and may be defined by a developer of the computer game. For example, the taxonomy may specify that a "bracelet" is a type of "jewelry". Accordingly, the computer game 150 may create an edge between a "silver bracelet" node and a testimony node describing the culprit as wearing "silver jewelry". Further, the computer game 150 may also create an edge based on wildcard testimony. Wildcard testimony refers to testimony that describes only properties of an object, but not the object itself (e.g., "I saw that the culprit was wearing something that shined like silver", "I saw a silvery flash at the crime scene", etc.). Using the taxonomy, the computer game 150 may also create an edge between the wildcard testimony and the jewelry in the clue universe graph 154.

FIG. 5 illustrates an exemplary structure 502 of a taxonomy, according to one embodiment of the invention. As shown, the structure 502 is presented in Extensible Markup Language (XML) format and includes a definition 504 for noun labels and a definition 506 for adjective labels. Noun labels represent physical objects or people, while adjective labels describe a physical object or link the physical object to a trait of a suspect. The definition 504 for noun labels indicates that a noun label may represent a person, place, thing or crime and that the person may be a suspect. The definition 506 for adjective labels indicates that an adjective label may refer to a gender property, a height property, a body-type property, and a hair property.

As described above, the computer game 150 generates the clue universe graph 154 using the clues retrieved from the clue database 152. To do so, the computer game 150 may generate a clue node for each retrieved clue. Each clue node may include a hierarchy of labels according to the taxonomy. Using the hierarchy of labels, the taxonomy, and rules predefined by a developer of the computer game 150, the computer game 150 may also generate edges between the clue nodes, to form the clue universe graph 154.

In one embodiment, the predefined rules specify not to create an edge between any two object nodes. The predefined rules also specify to create an edge between an object node and a testimony node having a matching label. The predefined rules also specify to create an edge between two testimony nodes having a matching label. The predefined rules also specify to use the taxonomy to check for conflicting traits and not to create any edge between clue nodes associated with conflicting traits. For example, an edge should not be created between: (i) a testimony node describing the culprit wearing a female silver bracelet and (ii) an object node representing a male silver bracelet, because of the conflicting male and female traits, according to the taxonomy. The predefined rules also specify to create an edge between an object node and a wildcard testimony node only if a predefined threshold count of labels match.

As described above, once the mystery graph 156 is generated, the computer game 150 may present a mystery to the user, based on the mystery graph 156. The mystery may be presented to the user via a computer-generated environment (e.g., a virtual world), a web animation, a web page, etc. FIGS. 6A-6B illustrate a GUI screen 600 of the computer game 150, according to one embodiment of the invention. As shown, the GUI screen includes a web page that presents clues 614 pertaining to a particular mystery. Each clue 614 includes a graphical image 604, a clue type 606, a physical object name 608, an entity name 610, and text 612.

As shown, the GUI screen 600 includes properties 602 associated with the mystery. The properties 602 include a mystery identifier, a scene name, a game mode, and a difficulty level. In one embodiment, the GUI screen 600 also includes controls 616. The user playing the computer game 150 may use the controls 616 to specify who the user believes is the culprit in the mystery. The GUI screen 600 may also include an indication 618 of whether the user has chosen the correct suspect as the culprit, responsive to input submitted using the controls 616.

In one embodiment, once the mystery graph 156 is generated, but before presenting the mystery to the user, the computer game 150 may modify the mystery graph 156 to enhance the narrative quality and/or to customize the difficulty level of the mystery. For example, the computer game 150 may modify the mystery graph 156 to include other clues such as leads, keys, lanterns, red herrings, false testimony, and/or a prime suspect, each of which are now described in more detail.

In one embodiment, a lead is information added to the mystery to provide an additional chain of inference leading to the culprit, thereby lowering the difficulty level of the mystery. For example, a lead may be added to point to an important clue in solving the mystery. A lantern also provides an additional chain of inference leading to the culprit. However, the lantern only becomes accessible to the user subsequent to a predefined user interaction with a key (e.g., the user examining the key). A red herring may be added by: (i) selecting a first clue that creates a chain of inference to a suspect and (ii) selecting a second clue that negates the created chain of inference to the suspect.

In one embodiment, false testimony may be added to mislead the user who is attempting to solve the mystery. The computer game 150 may also provide a user with a tool which, when used, reveals to the user which portions of testimony is false. For example, false testimony may be visually distinguished from true testimony (e.g., red font as opposed to white font). In the GUI screen 600 of FIGS. 6A-6B, false testimony is presented as underlined text. Further, a prime suspect (who is not a culprit) may also be added to mislead the user attempting to solve the mystery. The computer game 150 may designate a prime suspect and create a chain of inference to most, but not all, of the traits of the prime suspect.

In one embodiment, the computer game 150 may also add other clues to mislead the user attempting to solve the mystery. For example, the computer game 150 may add alibis for each suspect who is not a culprit. The computer game 150 may also add a false alibi for the culprit. In one embodiment, an alibi refers to a clue that negates a chain of inference between the suspect node and the crime node. A false alibi refers to a clue that purportedly negates a chain of inference between the suspect node and the crime node but that is invalid. Hence, the false alibi bears no logical value to the user attempting to solve the mystery.

In one embodiment, the computer game 150 may also add a false alibi for a suspect who is not a culprit, to cover up an incident embarrassing to the suspect or to cover up another crime not related to the mystery the user is attempting to solve. Further, the computer game 150 may add a false alibi for a suspect who is not a culprit and who has an embarrassing alibi. Further, the computer game 150 may also add other crimes not related to the mystery the user is attempting to solve and create chains of inferences between the suspects and the other crimes. Advantageously, the computer game 150 may generate compelling mysteries for the user to solve, thereby improving user satisfaction with the computer game 150.

Figure 7:
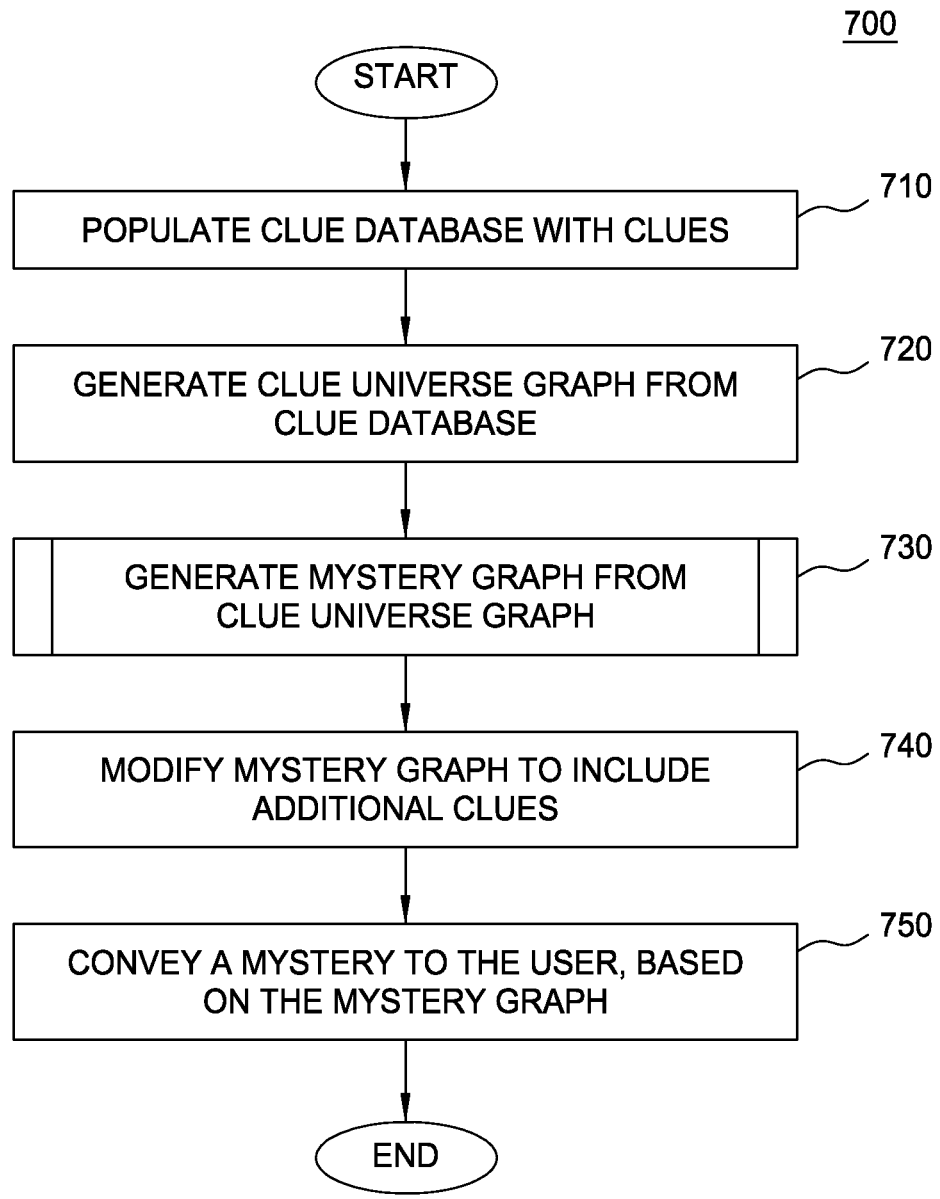
FIG. 7 is a flowchart depicting a method for providing a mystery in the computer game, according to one embodiment of the invention.

FIG. 7 is a flowchart depicting a method 700 for providing a mystery in the computer game, according to one embodiment of the invention. As shown, the method 700 begins at step 710, where the clue database 152 is populated with clues. As described above, the clues may be created programmatically and/or in response to user input. At step 720, the computer game 150 generates the clue universe graph 154 from the clue database 152. In an alternative embodiment, a separate application generates the clue universe graph 154, and the clue universe graph 154 acts as a static input to the computer game 150. In other words, the computer game 150 need not re-generate the clue universe graph 154 and may instead generate multiple mystery graphs from the same clue universe graph 154.

At step 730, the computer game 150 generates a mystery graph 156 from the clue universe graph 154. The step 730 is further described below in conjunction with FIG. 8. At step 740, the computer game 150 modifies the mystery graph 156 to include additional clues. For example, the mystery graph may be modified to include leads, keys, lanterns, alibis, and/or false testimony. At step 750, the computer game 150 may present a mystery to the user, based on the mystery graph 156. After the step 750, the method 700 terminates.

Figure 8:
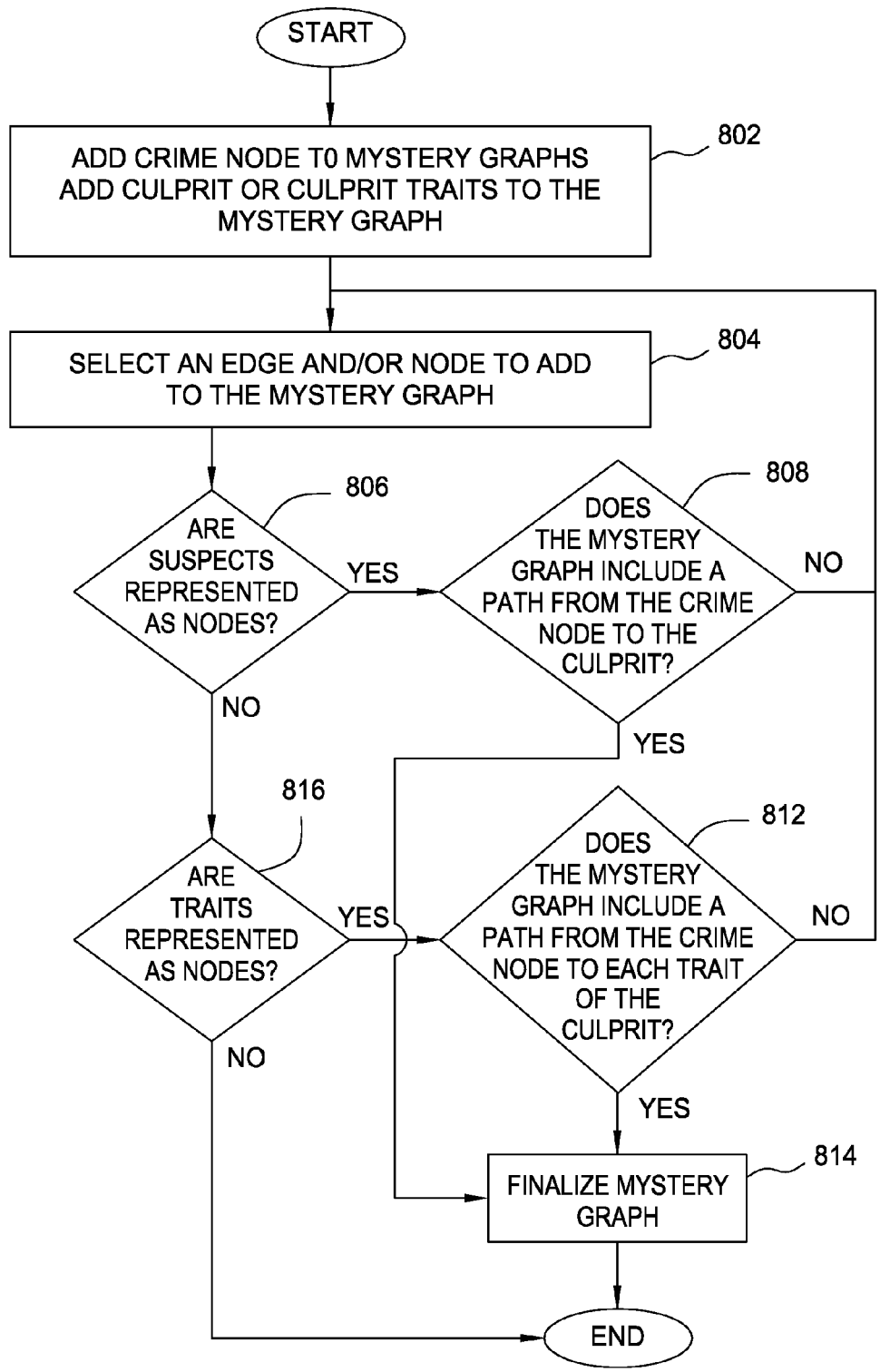
FIG. 8 is a flowchart depicting a method for generating the mystery graph from the clue universe graph, according to one embodiment of the invention.

FIG. 8 is a flowchart depicting a method 800 for generating the mystery graph from the clue universe graph, according to one embodiment of the invention. The method 800 corresponds to the step 730 of FIG. 7. Prior to the steps of the method 800, the computer game 150 may initialize an empty mystery graph 156 that has no nodes and no edges. During the method 800, the computer game 150 evaluates which nodes and/or edges from the clue universe graph 154 to include in the mystery graph 156. Including a node or edge from the clue universe graph 154 in the mystery graph 156 may also be referred to as activating the node or edge of the clue universe graph 154.

As shown, the method 800 begins at step 802, where the computer game 150 determines to include the crime node in the mystery graph 156. Also at step 802, the computer game 150 determines to add a culprit node (or the trait node(s) of a culprit, depending on the embodiment) to the mystery graph 156. At step 804, the computer game 150 selects an edge and/or node to add to the mystery graph 156. The selection at the step 804 may be random or may be determined heuristically, based on properties of nodes. For example, each node and/or edge may include a weighting factor that determines a likelihood of the node and/or edge being selected by the computer game 150 at the step 804.

In one embodiment, if suspects are represented as nodes (step 806), the computer game 150 determines whether a mystery graph includes a chain of inference between the crime node and the culprit. If not, the computer game 150 returns to the step 804 to add another edge and/or node to the mystery graph 156. In this way, the computer game 150 adds nodes and/or edges (the step 804) until a chain of inference exists between the crime node and the culprit (the step 808).

Alternatively, in one embodiment, if suspects are represented as traits (step 810), the computer game 150 determines whether a mystery graph includes a chain of inference between the crime node and each trait of the culprit (step 812). If not, the computer game 150 returns to the step 804 to add another edge and/or node to the mystery graph 156. In this way, the computer game 150 adds nodes and/or edges (the step 804) until a chain of inference exists between the crime node and each trait of the culprit (the step 812).

Once the chain of inference exists (the step 808 or the step 812), the computer game 150 finalizes the mystery graph 156 (step 814). For example, the computer game 150 determines whether the mystery graph 156 is logically coherent. For instance, the computer game 150 determines whether the mystery graph 156 connects the crime node to a single suspect/traits uniquely identifying the single suspect, where the single suspect is the culprit. After the step 814, the method 800 terminates.

Advantageously, embodiments of the invention provide a framework for generating mysteries in a computer game. In one embodiment, the framework includes a data structure representing the entire universe of clues in the computer game. The computer game determines one or more of the clues to include in a mystery, where each distinct subset of nodes and/or edges represents a different mystery that may be solved by a user playing the computer game. Before presenting the mystery to the user, the computer game may also evaluate and/or modify various properties of the mystery, e.g., to enhance a narrative quality of the mystery or to customize the difficulty level of the mystery. Advantageously, greater numbers of distinct and compelling mysteries may be more efficiently and/or conveniently generated for the computer game, thereby providing the user with a richer variety of compelling mysteries and increasing user satisfaction with the computer game.

While embodiments herein are described with reference to a framework for generating mysteries involving a crime scene, other embodiments are broadly contemplated. For example, those skilled in the art will recognize that the techniques disclosed herein may be adapted to provide a framework for generating any problem situation in a computer game, where the user is asked to make inferences based on fact patterns to select a candidate for solving the problem situation.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing a framework for generating a plurality of problem situations in a computer game, wherein the framework comprises a data structure representing: (i) a plurality of candidates associated with the plurality of problem situations, (ii) a plurality of fact patterns associated with the plurality of candidates, and (iii) a designation of at least one of the plurality of candidates as a solution to a problem situation of the plurality of problem situations; wherein each of the plurality of fact patterns includes at least one property used for determining an association in the data structure, wherein the data structure comprises a chain of inference between the designation and each candidate of the plurality of candidates, wherein each chain of inference comprises at least one of the plurality of fact patterns; and
generating, from the data structure and by operation of one or more computer processors, a representation of the problem situation by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

2. The computer-implemented method of claim 1, further comprising:
receiving user input specifying at least one of: (i) a candidate of the plurality of candidates and (ii) a fact pattern of the plurality of fact patterns.

3. The computer-implemented method of claim 1, wherein at least one of the plurality of fact patterns comprises one of an object and a statement made by one of the plurality of candidates.

4. The computer-implemented method of claim 3, wherein the statement made by one of the plurality of candidates links another candidate of the plurality of candidates to at least one of the object and the designation.

5. The computer-implemented method of claim 1, wherein the association in the data structure is further determined based on a taxonomy comprising at least one noun label representing an object and at least one adjective label representing a trait of a candidate.

6. The computer-implemented method of claim 1, wherein each candidate of the plurality of candidates is uniquely identified using a plurality of traits that characterize a physical appearance of the respective candidate.

7. The computer-implemented method of claim 1, wherein the data structure comprises a graph, and wherein the plurality of candidates, the plurality of fact patterns, and the designation are represented as nodes in the graph.

8. A non-transitory computer-readable storage medium containing a program which, when executed, performs an operation comprising:

providing a framework for generating a plurality of problem situations in a computer game, wherein the framework comprises a data structure representing: (i) a plurality of candidates associated with the plurality of problem situations, (ii) a plurality of fact patterns associated with the plurality of candidates, and (iii) a designation of at least one of the plurality of candidates as a solution to a problem situation of the plurality of problem situations; wherein each of the plurality of fact patterns includes at least one property used for determining an association in the data structure, wherein the data structure comprises a chain of inference between the designation and each candidate of the plurality of candidates, wherein each chain of inference comprises at least one of the plurality of fact patterns; and generating, from the data structure, a representation of the problem situation by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

9. The computer-readable storage medium of claim 8, wherein the operation further comprises:

receiving user input specifying at least one of: (i) a candidate of the plurality of candidates and (ii) a fact pattern of the plurality of fact patterns.

10. The computer-readable storage medium of claim 8, wherein at least one of the plurality of fact patterns comprises one of an object and a statement made by one of the plurality of candidates.

11. The computer-readable storage medium of claim 10, wherein the statement made by one of the plurality of candidates links another candidate of the plurality of candidates to at least one of the object and the designation.

12. The computer-readable storage medium of claim 8, wherein the association in the data structure is further determined based on a taxonomy comprising at least one noun label representing an object and at least one adjective label representing a trait of a candidate.

13. The computer-readable storage medium of claim 8, wherein each candidate of the plurality of candidates is uniquely identified using a plurality of traits that characterize a physical appearance of the respective candidate.

14. The computer-readable storage medium of claim 8, wherein the data structure comprises a graph, and wherein the plurality of candidates, the plurality of fact patterns, and the designation are represented as nodes in the graph.

15. A system, comprising:
one or more computer processors;
a memory containing a program which, when executed by the one or more computer processors, is configured to perform an operation comprising:

providing a framework for generating a plurality of problem situations in a computer game, wherein the framework comprises a data structure representing: (i) a plurality of candidates associated with the plurality of problem situations, (ii) a plurality of fact patterns associated with the plurality of candidates, and (iii) a designation of at least one of the plurality of candidates as a solution to a problem situation of the plurality of problem situations; wherein each of the plurality of fact patterns includes at least one property used for determining an association in the data structure, wherein the data structure comprises a chain of inference between the designation and each candidate of the plurality of candidates, wherein each chain of inference comprises at least one of the plurality of fact patterns; and generating, from the data structure, a representation of the problem situation by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

16. The system of claim 15, wherein the operation further comprises:

receiving user input specifying at least one of: (i) a candidate of the plurality of candidates and (ii) a fact pattern of the plurality of fact patterns.

17. The system of claim 15, wherein at least one of the plurality of fact patterns comprises one of an object and a statement made by one of the plurality of candidates.

18. The system of claim 17, wherein the statement made by one of the plurality of candidates links another candidate of the plurality of candidates to at least one of the object and the designation.

19. The system of claim 15, wherein the association in the data structure is further determined based on a taxonomy comprising at least one noun label representing an object and at least one adjective label representing a trait of a candidate.

20. The system of claim 15, wherein each candidate of the plurality of candidates is uniquely identified using a plurality of traits that characterize a physical appearance of the respective candidate.

21. The system of claim 15, wherein the data structure comprises a graph, and wherein the plurality of candidates, the plurality of fact patterns, and the designation are represented as nodes in the graph.

22. A data structure stored on a non-transitory computer readable storage medium, wherein the data structure comprises:

(i) a plurality of candidates associated with a plurality of problem situations of a computer game;
(ii) a plurality of fact patterns associated with the plurality of candidates;
(iii) a designation of at least one of the plurality of candidates as a solution to a problem situation of the plurality of problem situations; and
(iv) a chain of inference between the designation and each candidate of the plurality of candidates, wherein each chain of inference comprises at least one of the plurality of fact patterns;

wherein each of the plurality of fact patterns includes at least one property used for determining an association in the data structure, wherein a representation of the problem situation is generated from the data structure by determining a subset of the plurality of fact patterns of the data structure to include in the representation of the problem situation, wherein the representation of the problem situation comprises the chain of inference between the designation and a candidate of the plurality of candidates, whereby the chain of inference designates the candidate as at least part of the solution to the problem situation in the computer game.

23. A computer-implemented method, comprising:

providing a framework for generating a plurality of mysteries in a computer game, wherein the framework comprises a data structure representing: (i) a plurality of suspects associated with the plurality of mysteries, (ii) a plurality of clues associated with the plurality of suspects, and (iii) a designation of at least one of the plurality of suspects as a culprit; wherein the data structure comprises a chain of inference between the designation and each suspect of the plurality of suspects, wherein each of the plurality of clues includes at least one property used for determining an association in the data structure, wherein each chain of inference comprises at least one of the plurality of clues; and generating, from the data structure and by operation of one or more computer processors, a representation of a mystery by determining a subset of the plurality of clues of the data structure to include in the representation of the mystery, wherein the representation of the mystery comprises the chain of inference between the designation and a suspect of the plurality of suspects, whereby the chain of inference designates the suspect as the culprit of the mystery in the computer game.

* * * * *